Nov. 25, 1941. W. G. H. FINCH 2,263,985
POWER TRANSMITTING MECHANISM
Original Filed May 11, 1936 4 Sheets-Sheet 1

Inventor
William G. H. Finch
Ostrolenk, Greene & Marsen
Attorneys

Nov. 25, 1941.  W. G. H. FINCH  2,263,985
POWER TRANSMITTING MECHANISM
Original Filed May 11, 1936   4 Sheets-Sheet 3

Inventor
William G. H. Finch
Ostrolenk, Greene & Marsen
Attorney

Patented Nov. 25, 1941

2,263,985

UNITED STATES PATENT OFFICE 2,263,985

POWER TRANSMITTING MECHANISM

William G. H. Finch, Newtown, Conn.

Original application May 11, 1936, Serial No. 78,993. Divided and this application February 22, 1938, Serial No. 191,852

11 Claims. (Cl. 74—395)

This invention relates to synchronizing systems, and more particularly relates to novel methods of and apparatus for maintaining a telepicture receiver in phase synchronism with the transmitter.

This application is a division of my copending application Serial No. 78,993, filed May 11, 1936.

Prior synchronizing systems comprised a friction clutch interposed between the driving motor and the telepicture drum. Synchronizing signals were used to disengage the friction clutch until the receiver drum was in phase synchronism with the corresponding transmitter drum and then re-engage the clutch so that the receiver drum would continue to rotate in proper phase synchronism. However, a friction clutch could not maintain accurate phasing of the apparatus since slight slippage inherent in the friction clutch, and intensified by wearing thereof, could not positively predetermine phase synchronous positions.

In my Reissue Patent No. 19,575, I disclose a positive driving connection between the scanner and the motor. The positive driving connection includes a pawl and ratchet wheel which are normally engaged to maintain the scanner in operation. When the scanner is out of phase, the positive driving connection is disconnected at the pawl and ratchet wheel until the scanner is in proper position. A cyclic synchronizing signal reengages the pawl and ratchet to continue the synchronous operation of the scanner.

In my U. S. Patent No. 2,047,863, issued July 14, 1936, I disclose a positive or overrunning clutch in the positive driving connection between the motor and the telepicture drum. The receiver drum is rotated at a slightly faster rate than the corresponding transmitter drum. The overrunning clutch is disengaged at a predetermined angular position of the drum until the synchronizing signal reengages it. The synchronizing signal is transmitted during the corresponding angular position of the transmitter drum so that both drums are maintained in accurate phase synchronous relation.

In accordance with my present invention, I contemplate a positive driving connection between the motor and telepicture drum with means for changing the relative phase relation between the motor and the drum without interrupting the positive drive connection.

The motor drives the telepicture drum through a worm and worm gear arrangement which normally interlock to transmit the rotative power in a positive driving relation. Means are provided for rotating the worm when the receiver drum is out of phase synchronism. The rotation of the worm changes the phase relation between the motor and the drum without interrupting the positive driving connection therebetween.

The worm is turned when the drum is out of phase synchronism with respect to the transmitter drum under the control of cyclic synchronizing signals. Normal interlocking of the worm wheel with the worm gear permits a normal rotation of the telepicture drum. However, when the worm wheel is turned, a phase correcting motion is superimposed upon the normal rotation of the worm gear connected to the drum.

In a preferred arrangement, the worm wheel moves the worm gear in a direction opposite to the normal rotation thereof. The superposition of the two opposite rotative effects produces a resultant rotation of the drum. Since the positive driving relation between the motor and the drum is maintained during angular correction, my invention may be termed a controlled slip driving mechanism. The slip, or relative angular change between the motor and the drum is directly controlled by rotation of the worm wheel normally interlocking with the worm gear.

In a preferred embodiment of my invention, the worm wheel superimposes a speed of rotation upon the drum equal to its normal speed of rotation but in the opposite direction or sense thereto. The resultant is an effective stand-still or interruption of rotation of the telepicture drum without the use of a friction brake, clutch or the like. The drum is subjected to the controlled slip angular correction if it reaches a predetermined position in its rotation cycle before the synchronizing signal is received. The effect of the controlled slip is to maintain the drum at this predetermined position until the synchronizing signal is received without interrupting the positive driving connection between the drum and the motor. The synchronizing signal interrupts the controlled slip of the drum to continue its rotation in accurate phase synchronous relation with the transmitter drum.

It is accordingly an object of my present invention to provide novel methods of and means for maintaining remote electro-mechanical systems in synchronous relation.

Another object of my invention is to provide novel methods of and apparatus for maintaining a telepicture receiver in phase synchronism with its transmitter.

It is still another object of my invention to provide novel methods of and means for effecting stand-still of a driven member while maintaining a positive driving connection with its source of motive power.

A further object of my invention is to provide novel methods of and means for changing the relative angular position of a rotating member without interrupting its positive drive connection to the driving member.

It is still a further object of my invention to provide a novel synchronizing system whereby the translating member at a remote station is maintained in phase synchronous relation with the corresponding member at a transmitter station by controlling its angular position with cyclic synchronizing signals without the interruption of a positive driving connection to the source of motive power for the translating member.

These and other objects of my invention will become evident in the following description taken in connection with the drawings, in which.

Figure 1:
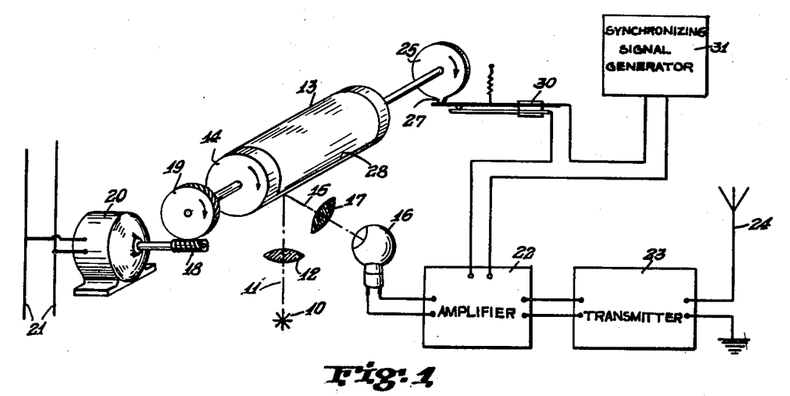
Figure 1 is a schematic illustration of a telepicture transmitter.
Figure 2:
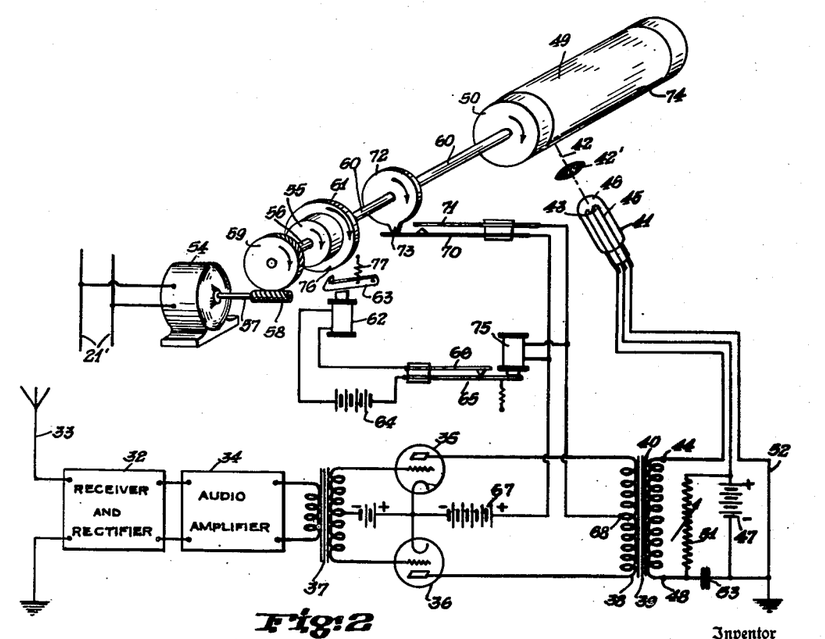
Figure 2 is a schematic illustration of a telepicture receiver.

The schematic diagrams Figures 1 and 2, of a telepicture transmitter and receiver respectively, are described to more clearly set forth the function and relation of the synchronizing mechanism of my present invention. It is to be understood that the telepicture system and circuits described are by example only and that the synchronizing mechanism to be hereinafter described in detail is applicable to other telepicture or facsimile systems.

Referring to Figure 1, a source of light 10 generates a beam 11 focused to a point by a lens system 12 upon the picture 13 to be transmitted, which is mounted on the cylindrical drum 14. If the picture is scanned one hundred lines per inch, the diameter of the light spot focused upon the picture 13 should be .01 inch. The refracted beam 15 from the picture is focused upon the photo-electric cell 16 by lens system 17. The intensity of the refracted beam 15 is proportional to the shading of the picture elements which are successively moved past the light beam 11.

The picture drum 13 is rotated by worm 18 and worm gear 19 which suitably reduce the speed of the motor 20. Motor 20 is preferably a synchronous motor connected to a commercial electrical supply line 21, for example a sixty cycle, 110 volt system. The drum may be driven at a normal speed of 100 revolutions per minute which, with one hundred lines scanned per inch, results in one inch of the picture traversed per minute.

The refracted picture light beam 15 impinging on photo-electric cell 16 produces corresponding electrical signals which are amplified by amplifier 22. A light "chopper" or an audio frequency carrier wave may be employed with the amplifier 22 to facilitate transmission of the varying unidirectional picture signals as is well known in the art.

The telepicture signals may be directly transmitted to a remote station over wire lines or may be transmitted by radio transmission means. Figure 1 illustrates a transmitter 23 connected to the output of amplifier 22 for converting the audio frequency telepicture signals into corresponding radio frequency signals which are radiated by antenna 24.

Synchronizing signals are cyclically transmitted for effecting synchronization of the transmitter scanning apparatus in a manner to be described in detail. The synchronizing signals are preferably transmitted once per scanning operation. When a drum is used as in the preferred embodiment, the "underlap" period of the rotation cycle is employed to transmit the synchronizing signal. The underlap period corresponds to the portion of the picture drum where the opposite ends of the picture 13 are gripped or otherwise fastened into position on the drum. In a continuous sheet system, the synchronizing signal is transmitted during the return oscillation movement, marking the beginning and end of each scanning line excursion. The transmission of a synchronizing signal for a continuous sheet system is described in my Reissue Patent No. 19,575.

A cam 25 is mounted upon the shaft 26 of the telepicture drum 14. A projection 27 of the cam 25 is positioned angularly corresponding to the underlap portion of the drum 14. The edge 28 of the picture sheet 13 determines one side of the underlap zone and is gripped by clamping means internal to the drum 14 in a manner preferably as described in my co-pending application Serial No. 72,990 filed April 6, 1936.

The synchronizing cam switch 30 is cyclically closed by the cam projection 27 to impress suitable synchronizing impulses upon the amplifier 22 from the synchronizing signal generator 31. Synchronizing switch 30 is connected in series with the synchronizing signal generator 31 output to a suitable portion of the telepicture amplifier 22 schematically indicated in Figure 1. The synchronizing impulses effective during the underlap period is preferably of intensity somewhat greater than the maximum or "white" telepicture signal intensity in order to readily distinguish the synchronizing signals from the telepicture signals at the receiver.

The synchronizing signal generator 31 may be a direct current source which produces a unidirectional impulse at each closure of cam switch 30 or may be an audio carrier frequency signal which is unmodulated during the synchronizing period and is suitably modulated by the picture signals during the remaining period of the cycle. A preferred embodiment of such a method for signal generation forms the basis of my copending application Ser. No. 74,419.

Figure 2 is a scehmatic diagram of a telepicture receiver used in conjunction with the transmitter of Figure 1 and employing the synchronizing mechanism of my present invention. A radio receiver and rectifier 32 is connected to a receiving antenna 33 for receiving the radio transmitted signals from the radio transmitter 23. If a wire line is used, suitable amplifying and line equipment are instead employed. The output of the receiver and rectifier 32 are connected to an audio amplifier 34. The output of audio amplifier 34 is coupled to a class B push-pull output stage 35—36 by an inter-stage coupling transformer 37. The output of the push-pull stage 35—36 is connected to the primary 38 of the output transformer 39. The output of the secondary 40 of transformer 39 is connected to a photolamp 41 containing a gas such as neon, for producing a light beam 42 output in accordance with the telepicture signals received. The light output 42 from lamp 41 is suitably focused upon the record sheet 49 on the receiving drum 50 by a lens system 42'.

I prefer to use a neon crater photo-lamp 41 having a control electrode 43 which is connected to one terminal 44 of the transformer secondary 40, and an auxiliary or striking electrode 45. The crater plate 46 of lamp 41 is connected to the positive terminal of a suitable direct current source 47, the negative terminal of which is connected to ground. The other terminal 48 of the transformer secondary 40 is connected to the crater plate 46 through a variable resistance 51. The auxiliary or striking electrode 45 is connected to ground by lead 52. As is well known in the art, the auxiliary electrode 45 maintains a striking or discharge condition at the photolamp crater plate 46, so that it will always be in readiness to respond to telepicture signals introduced between the plate 46 and the control grid 43. A by-pass condenser 53 is connected between the output terminal 48 and ground.

The receiver drum 50 is driven by a synchronous motor 54 connected to supply lines 21'. The lines 21' are preferably from the same alternating current supply lines 21 as those of the transmitter although such condition is not essential. The synchronous motor 54 drives drum 50 through the schematically indicated synchronizing phase adjusting mechanism 55. The phase synchronizing or angular drum adjusting mechanism 55 is described in detail hereinafter. The drum phasing mechanism 55 maintains a positive driving connection between the shaft 56 which is driven positively from the motor shaft 57 through worm 58 and worm gear 59, and the shaft 60 directly attached to the receiver drum 50.

A control plate 61 cooperating with the phasing mechanism 55 is actuated by the synchronizing magnet 62 through its armature 63. Drum 50 is preferably driven at a slightly faster speed than the corresponding transmitter drum 14, for example in a ratio of 101:100.

The phasing mechanism 55 is under the control of the synchronizing magnet 62 to maintain the drum 50 in phase synchronism with the transmitter drum 14 as will be hereinafter set forth. A direct current potential source 64 supplies the synchronizing magnet 62 through its relay contacts 65—66.

The anode potential source 67 for the push-pull amplifier stage 35—36 is supplied to the center tap 68 of the primary 38 through the synchronizing cam switch 70—71. A cam 72 is connected to the shaft 60 adjacent the drum 50. The projection 73 of the cam 72 is in the same angular position on shaft 60 as the underlap or "dead" zone 74 of the drum 50. The cam switch 70—71 is normally maintained closed during the major portion of the rotation of cam 72, and the anode current from source 67 normally directly flows to the push-pull amplifier stage 35—36 during the reception of the telepicture signals.

The cam switch 70—71 is opened by the projection 73 of the cam 72 during the synchronizing or underlap period of the receiver. The anode current from source 67 is accordingly directed to the amplifier 35—36 through the synchronizing relay 75, which relay 75 is otherwise short-circuited by switch 70—71.

The synchronizing signal, as hereinabove described, occurs during the underlap period of the picture transmitter, and is preferably of greater magnitude than the telepicture signals. Synchronizing relay 75 is preferably a marginal relay responding only to the increased magnitude signals so as to avoid the possibility of interference of the synchronizing action by any of the telepicture signals. The push-pull amplifier 35—36 rectifies an alternating current synchronizing impulse in the anode lead if such is used, and the actuation of the relay 75 is by rectified or unidirectional current as will be understood by those skilled in the art.

Although I prefer to use synchronizing signals of increased intensity, and a marginal synchronizing relay, I have also successfully employed synchronizing signals of intensity equal to the maximum intensity picture signals to operate an ordinary relay. It is also to be understood that the synchronizing magnet 62 may be directly energized by the synchronizing signals, displacing the relay 75.

The receiver drum 50 is prepared for the synchronizing signal during its underlap period by cam 72. The synchronizing signal will flow through to energize the synchronizing relay 75 which then closes the relay contacts 65—66, locally energizing the synchronizing magnet 62. The synchronizing magnet 62, when energized, will attract the armature 63 away from control plate 61 to permit the phasing mechanism 55 to continue to normally drive the receiver drum 50; i. e., if the drum 50 were in phase synchronism and in proper phase, the release of armature 63 away from the plate 61 would avoid phasing or angular correction by the mechanism 55.

The control plate 61 of the phase correcting mechanism 55 has a notch 76 on its periphery; the angular position of notch 76 corresponds to the angular position of the underlap zone 74 of drum 50 and that of the projection 73 of cam 72. The armature 63 is normally mechanically biased by spring 77 against the periphery of the control plate 61. Armature 63 accordingly engages the notch 76 of control plate 61 and holds it against rotation. By preventing the rotation of control plate 61, the angular or phase correcting mechanism 55 is actuated to effect the phase synchronism of drum 50 with transmitter drum 14 in a manner to be described in detail hereinafter.

By rotating drum 50 at a slightly faster rate than the transmitter drum 14, for example in the ratio of 101:100, the underlap period of the drum 50 will reach the predetermined position corresponding to the engagement of armature 63 of notch 76 slightly before the normal reception of the synchronizing signal from the transmitter. The cam 72 will accordingly open cam switch 70—71 by the projection 73 and permit the energization of synchronizing relay 75 by the synchronizing impulse as it is received. The energization of synchronizing relay 75 by the synchronizing impulse will close relay 65—66 to correspondingly energize the synchronizing magnet 62 to attract the armature 63 away from engagement with notch 76 of control plate 61. The positive driving connection between the motor 54 and the drum 50 is continuously maintained and the synchronizing signal in attracting the armature 63 from the control plate 61 permits the drum 50 to continue rotating with the positive driving connection intact and in accurate phase synchronous relation with the transmitter drum.

Figure 3:
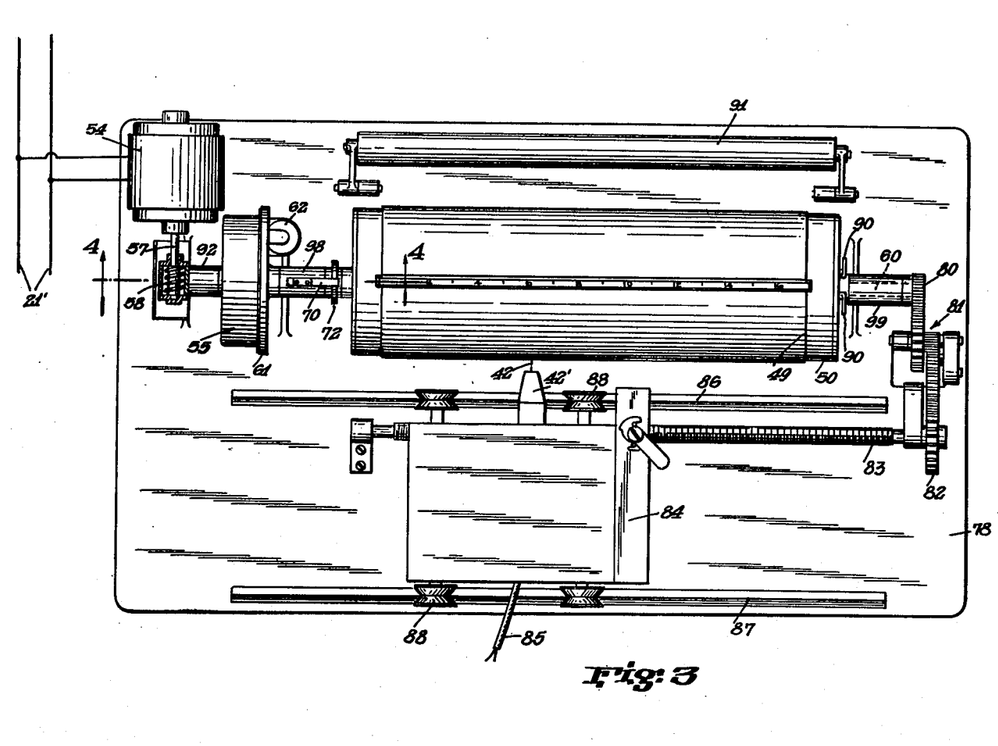
Figure 3 is a plan view of a preferred embodiment of a telepicture receiver embodying the novel phasing mechanism.

Figure 3 is a plan view of a preferred embodiment of a telepicture receiver utilizing the phasing or angular correcting mechanism 55 hereinabove described. The apparatus is mounted upon a cast iron base 78. The motor 54 drives drum 50 through the mechanism 55 by worm 58. A pinion 80 connected to the end of shaft 60 drives a reduction gear train 81 to rotate, at a predetermined reduced ratio, the spur gear 82 which is connected to one end of the worm or scanner feed screw 83. The worm 83 is connected to the carriage 84 containing the electrooptical scanning mechanism electrically connected to the receiver equipment by cable 85. Carriage 84 is moved parallel to the axis of drum 50 along tracks 86—87 guiding rollers 88 of carriage 84. Details of the scanning arrangement are described in my co-pending application Serial No. 47,863 referred to above.

The focusing system 42' for the recording light beam 42 corresponds to the optical recording system described in connection with Figure 2 to translate the receiving telepicture signals upon the sensitive recording sheet 49 fastened on drum 50. The record sheet 49 is attached to the drum 50 by internal clamping mechanism such as disclosed in my application Serial No. 72,990, filed April 6, 1936, operated by levers 90. Roller 91 is pressed upon drum 50 to facilitate mounting of the record sheet 49 thereon by continuously smoothly pressing against the sheet.

Figure 4:
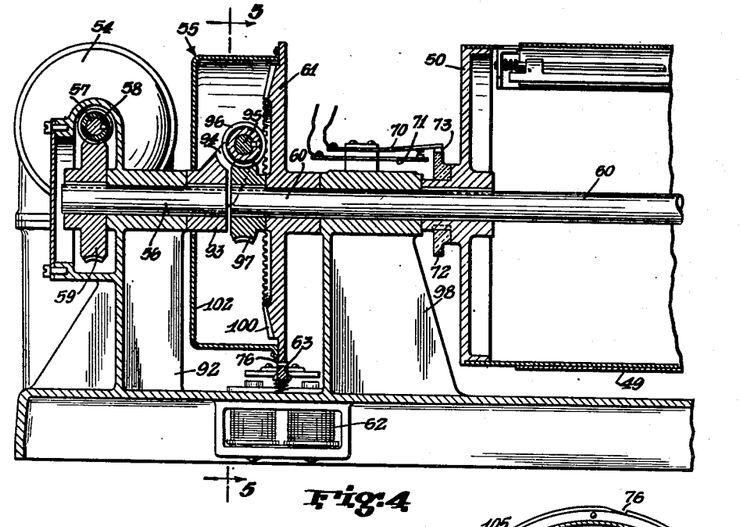
Figure 4 is a longitudinal sectional view taken along 4—4 of Figure 3.

Figure 4 is the cross-sectional view taken along 4—4 of Figure 3 through the phase correcting mechanism 55. The shaft 57 of motor 54 drives worm 58 which rotates worm gear 59 keyed to shaft 56 which is journalled in bracket 92. A sleeve 93 is keyed to the end of shaft 56. A bracket 94 extends from sleeve 93 to rotatably support shaft 95 of worm wheel 96. Worm 96 coacts with worm gear 97 which in turn is keyed to one end of shaft 60. Shaft 60 is journalled in bracket 98 and also in bracket 99 at the opposite end of drum 50. Drum 50 is also keyed to the shaft 60. The synchronizing cam 72 is attached to the hub of drum 50. The synchronizing switch 70—71 is attached to the top of bracket 98 to coact with the cam 72.

Figure 5:
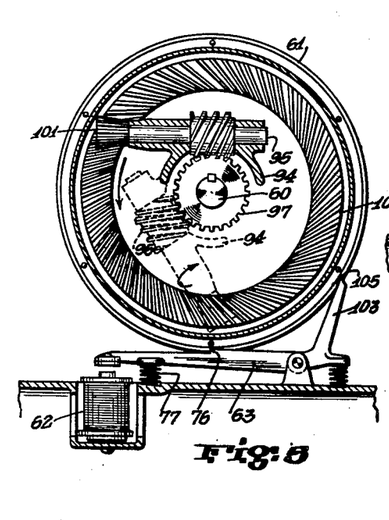
Figure 5 is the cross-sectional view taken along 5—5 of Figure 4, illustrating the operation of the phasing mechanism of my present invention.

The worm wheel 96 and worm gear 97 normally interlock to transmit the rotary motion of shaft 56 to shaft 60 in a one-to-one or continuous manner. Figure 5 illustrates the interlocking of worm 96 and worm gear 97. The control plate 61 is loosely mounted upon shaft 60 between worm gear 97 and bracket 98. A skew bevel gear 100 is integral with control plate 61 and coacts with a skew bevel pinion 101 attached to one end of the shaft 95 of worm 96. A housing 102 is attached to the outer edge of the control plate 61.

The normal interlocking of worm 96 and worm gear 97 causes the control plate 61 to rotate in correspondence with the normal rotation of shafts 56 and 60, through the normal interlocking of skew bevel gear 100 and its co-acting pinion 101. A positive driving connection is effected from motor shaft 57 through worm 58, worm gear 59, shaft 60, sleeve 93, worm 96 interlocking with worm gear 97 and shaft 60 to the drum 50. Worm 96 does not rotate during its normal interlocking with worm gear 97. The control plate 61, free to rotate on shaft 60, is freely turned thereon due to the interlocking of the skew bevel gears 100 and 101.

The armature 63 is normally biased by spring 77 against the periphery of control plate 61. When armature 63 engages with notch 76 the normal rotation (indicated counterclockwise) of control plate 61 is arrested. A pawl 103 is normally biased against control plate 61 by spring 104 to co-act with a notch 105 on control plate 61 at the instant armature 63 engages notch 76 in order to prevent rebound of the control plate 61 to insure immediate stoppage thereof.

When control plate 61 is stopped from its free rotation on shaft 60, pinion 101 is moved relative to the stationary teeth of the skew bevel gear 100 since the interlocking action of worm 96 and worm gear 97 forces it to execute this relative motion. The relative movement of the pinion 101 on skew gear 100 causes pinion 101 to rotate. Since worm shaft 95 is originally attached to pinion 101, the worm 96 will correspondingly rotate therewith. Rotation of pinion 101 as illustrated in Figure 5, will be clockwise as indicated by the arrow on the dotted position thereof. The dotted position of pinion 101 and worm 96 corresponds to the continued rotation of the worm 96 and pinion 101 from the solid position. Clockwise rotation of worm 96 is designed to superimpose upon worm gear 97 a motion opposite to its normal rotation.

Accordingly, since the normal rotation of worm gear 97 and its shaft 60 is counterclockwise, the superimposed rotation by worm 96 is made clockwise. The phasing or angular correction of the synchronizing mechanism of my present invention superimposes upon the normal rotation of the driven member a counter-rotation while maintaining a positive driving connection to the driven member. The ratio and proportions of the skew gears 100 and 101 and worm 96 and worm gear 97 are preferably chosen so that when the rotation of stop plate 61 is arrested, the counter-rotation superimposed upon driven shaft 60 is equal to the normal speed of rotation thereof but in the opposite direction. An effective standstill of the shaft 60 is effected by the mechanism 55.

Although in my preferred embodiment a counter-rotation at a rate equal to the normal rotation is used to effect the phasing or angular correction of the drum 50 with respect to the transmitter drum in response to synchronizing signals, it is to be understood that it is by way of example and not limitation. The principle of my present invention is also applicable to systems employing intermediate speeds of superimposed correction movement either in the counter-direction to the normal rotation or in the normal direction of rotation.

When control plate 61 is stopped by the armature 63, normally mechanically biased toward it, the shaft 60 of the drum 50 is affected by the action of the phasing mechanism 55. Since the receiver drum is preferably normally rotated at a slightly faster rate than the transmitter drum, armature 63 will engage notch 76 of control plate 61 just before the incoming synchronizing signal causes the energization of the synchronizing magnet 62. When synchronizing magnet 62 is energized by the synchronizing signal, the engagement of the control plate 61 with armature 63 is released, permitting the drum 50 to continue rotating in phase synchronous relation with the transmitter drum.

The synchronizing signal being transmitted during the underlap period as described in connection with Figure 1 marks the corresponding underlap position of the receiver drum which in turn corresponds to the position of notch 76 on control plate 61.

Figure 6:
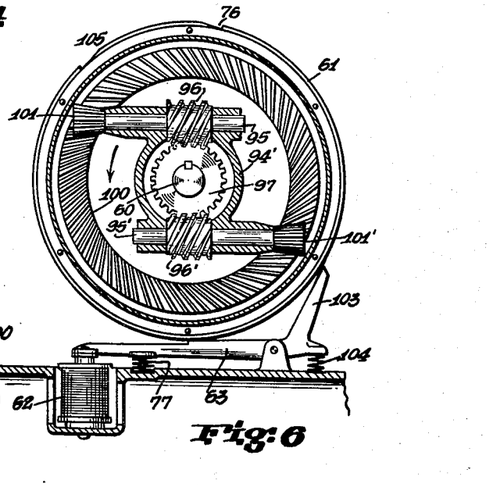
Figure 6 is a modification of my invention corresponding to Figure 5.

Figure 6 is a modification of the embodiment as illustrated in Figure 5 by employing two opposed worm wheels 96 and 96' coacting with the worm gear 97 upon a common bracket 94'. The corresponding skew bevel pinions 101 and 101' coact with the common skew bevel gear 100 integral with control plate 61. The action of the two opposed worm wheels 96—96' together with their corresponding pinions 100 and 101 is additive in that they impose a common direction of motion upon worm gear 97 when angular correction is effected. The opposed worm and pinion arrangement is preferable from the standpoint of dynamic balancing about the axis of rotation. The control plate 61 and skew bevel gear 100, integral therewith, is preferably made of a light weight alloy to minimize the effect of residual inertia in the operation of the control mechanism for the phase adjusting device 55.

Figure 7:
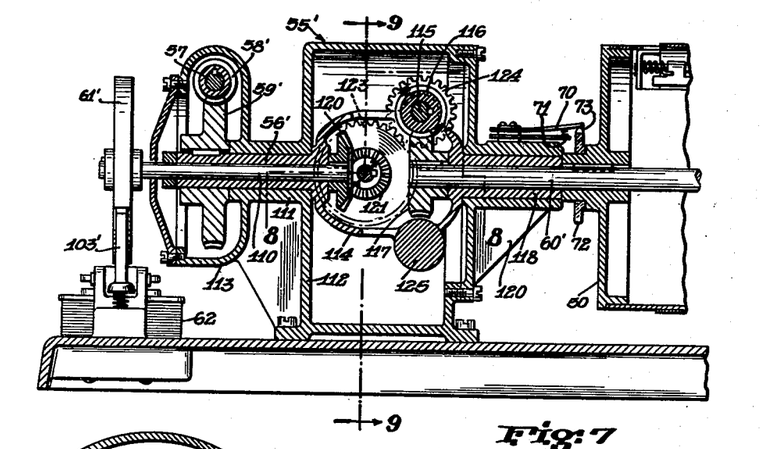
Figure 7 is a longitudinal cross-sectional view of a further modification of my present invention.

Figure 7 is a longitudinal cross-sectional view through another embodiment of the angular correcting mechanism 55' corresponding to the mechanism 55 described hereinabove. Shaft 57' connected to a suitable motor, drives worm 58' which engages with worm gear 59'. The worm gear 59' is keyed to sleeve 56' concentric with control shaft 110. Sleeve 56' is journalled in bearing 111 extending from the housing 112 of mechanism 55' and integral with housing 113 enclosing worm gear 59' and worm 57'.

Bracket member 114 extends from sleeve 56' and rotatably supports shaft 115 of worm wheel 116. Worm 116 meshes with worm gear 117 which is keyed to shaft 60'. The telepicture drum 50 is keyed to shaft 60' to rotate therewith. Sleeve 118 is concentric with shaft 60' and is journalled in bearing 120 extending from housing 112. Sleeve 118 is integral with the bracket member 114 and supports the right end thereof.

A positive driving connection is maintained from the shaft 57' of the motor to the telepicture drum 50 as follows: Worm 58', worm gear 59', sleeve 60', bracket member 114, worm 116 supported by bracket 114 and interlocking with worm gear 117 which is keyed to shaft 60'. The interlocking of worm 116 with worm gear 117 corresponds to the similar portion of the previous embodiment illustrated in Figures 4 to 6.

The phasing or angular adjusting means of drum 50 with respect to the motor shaft 57' is effected by rotating worm 116 to superimpose a counter-rotation upon gear 117. The control plate 61' is situated external to the mechanism 55' and is connected thereto by the shaft 110 which is free to rotate relative to sleeve 56'. The control plate 61' is affected by the synchronizing magnet 62 and the synchronizing signals in a manner similar to the hereinabove described control plate 61. However, in the embodiment described in connection with Figures 7 to 10, the control plate is external to the mechanism 55' and is connected to the phasing worm wheel 116 by a series of gearing connections in the following manner.

Figure 8:
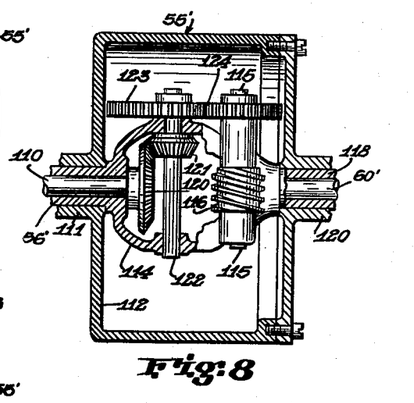
Figures 8 and 9 are sectional views taken along 8—8 and 9—9 of Figure 7 respectively showing details of the synchronizing apparatus.
Figure 9:
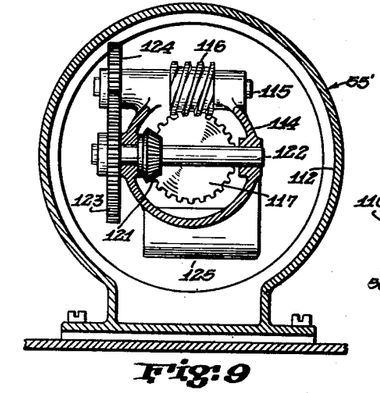

Referring to Figure 8, the rod 110 rotatably supported within sleeve 56' directly connects the control plate 61' to the bevel gear 120. A bevel gear 121 supported on rod 122 journalled in bracket member 114 meshes with the bevel gear 120. A spur gear 123 is external to the bracket member 114. Gear 123 meshes with gear 124 which is connected to the shaft 115 which supports the worm 116. Figure 9 is the sectional view taken through Figure 7 along 9—9 and further illustrates the intermeshing gears connecting the control plate 61' to the worm 116.

Worm 116 normally interlocking with worm gear 117 transmits the motive power directly imparted to bracket member 114 to the worm gear 117 to effect a link in the positive driving connection between the motor and the picture drum 50. Worm 116 does not normally rotate with its shaft 115 and is carried in a path concentric with the worm gear 117 with which it interlocks as bracket member 114 rotates. The spur gears 123 and 124 accordingly do not normally rotate but are also carried in a circular path as is the worm 116. The bevel gears 120 and 121 normally mesh but do not move with respect to each other in a similar manner. Since bevel gears 120 and 121 do not normally rotate with respect to each other and since bevel gear 121 is moved in a path concentric to the axis of bevel gear 120, the gear 120 will be forced to rotate while intermeshing with gear 121. Control plate 61' being connected to bevel gear 120 by rod 110 accordingly normally rotates during the rotation of the drum 50.

It is to be understood that during the normal operation of the drum 50 from the motor shaft 57', a positive driving connection is maintained therebetween, that worm 116 does not rotate on its axis but is carried in a path concentric to the axis of the drum shaft 60' and that bevel gear 121 also does not rotate on its axis but forces bevel gear 120 to rotate to correspondingly revolve control plate 61'. The normal rotation of rod 110 by the inter-meshing gearing system of mechanism 55' is at the same speed and direction as the rotation of sleeve 56' encircling the rod 110. The rod 110 accordingly revolves together with the sleeve 56' with zero relative speed therebetween.

Figure 10:
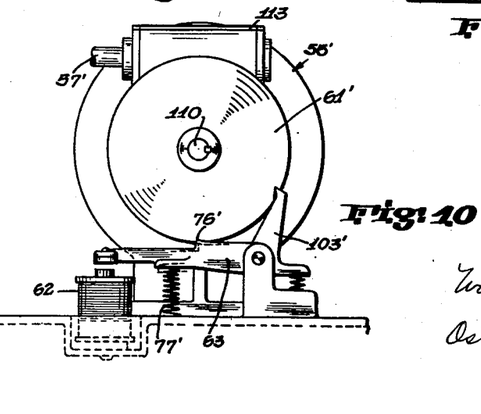
Figure 10 is an end view of the embodiment corresponding to Figure 7 illustrating the synchronizing mechanism control.

Figure 10 is an end view of the apparatus illustrated in Figure 7 showing the arrangement of the control plate 61', the synchronizing magnet 62 and the armature 63 coacting with a notch 76' in the control plate periphery. Spring 77' normally mechanically biases armature 63 toward the control disk 61'. Pawl 103' coacts with plate 61' to prevent rebound of the plate when its notch 76' is arrested by armature 63.

A counter-weight 125 is preferably cast integral with bracket member 114 to dynamically balance the gearing mechanism connected to the opposite side of the bracket member 114.

The operation of the phasing or angular correction mechanism 55' is similar to that described hereinabove in connection with the modification illustrated in Figures 4 to 6. The drum 50 is driven by the motor through the motor shaft 57' by the positive driving connection including the worm 58' and worm gear 59' which motivates the synchronizing mechanism 55'. The drum 50 is preferably driven at a slightly faster rate than the corresponding transmitter drum so as to insure the engagement of notch 76' of control disk 61' with armature 63. When the rotation of control disk 61' is arrested, the rotation of bevel gear 120 is prevented. Since bevel gear 121 is turned in a concentric path about the axis of rotation of the drum 50, the gear 121 will be forced to rotate as it rolls around the stopped bevel gear 120. Rotation of bevel gear 121 correspondingly rotates spur gears 123 and 124 to turn the shaft 115 of worm wheel 116. The rotation of worm wheel 116 superimposes a counter-rotation upon worm gear 117 to effect the angular correction by the mechanism 55'.

The ratio and proportions of the respective gearing in the phasing device 55' is designed so that by arresting the normal rotation of gear 120 the worm 116 is turned at a rate and in the direction to impose a counter-rotation upon gear 117 at a rate which is equal to its normal rotation. The drum 50 will be effectively stopped from rotation and held in the stop position while rotation of control plate 61 is effected by the synchronizing armature 63.

The position of notch 76' corresponds to the underlap portion of the drum 50 in relation to the optical scanning system and also corresponds to the position of cam 72 connected to the drum opening the synchronizing switch 70—71 by the cam projection 73. The synchronizing signal will cause synchronizing magnet 62 to be energized in a manner already described to attract armature 63 out of engagement from control disk 61' and permit it to continue its normal rotation. The synchronizing signal accordingly starts the telepicture drum 50 rotating in proper phase synchronous relation with respect to the transmitter drum as determined by the timing of the cyclic synchronizing signals.

In the preferred embodiments of my invention, the telepicture drum is effectively maintained at a "stand-still" if the drum is not in proper phase relation with the transmitter drum. If the drum is in the exact phase relation with the transmitter drum as determined by the timing of the synchronizing signals, a positive driving connection is maintained between the driving motor and the telepicture drum, so that no slippage can be had therebetween at any time, particularly during the phasing periods.

In accordance with my present invention, phase synchronism is effected in a definite and positive manner by superimposing the angular corrective motion upon the normal motivation of the drum while maintaining the positive driving connection to the drum. It will be evident to those skilled in the art that modifications falling within the broader spirit and scope of my invention are feasible, and I do not intend to be limited except as set forth in the following claims.

I claim:

1. A power transmitting device for coupling a driving shaft with a driven shaft comprising a worm gear secured to said driven shaft, a worm normally interlocked with said worm gear, for transmitting rotative power to said driven shaft when motivated by said driving shaft; mechanism for motivating said worm by said driving shaft including a hollow shaft and a framework supporting said worm integral with said hollow shaft; and means for counteracting the normal rotative effort of said driving shaft on said driven shaft at the interlocked portion of said worm gear and worm comprising a control shaft passing through said hollow shaft and means mounted on said framework interconnecting said worm and one end of said control shaft.

2. A power transmitting device for coupling a driving shaft with a driven shaft comprising a worm gear secured to said driven shaft, a worm normally interlocked with said worm gear, for transmitting rotative power to said driven shaft when motivated by said driving shaft; mechanism for motivating said worm by said driving shaft including a rotatable hollow shaft and supporting means for said worm integral with said hollow shaft; and means for counteracting the normal rotative effort of said driving shaft on said driven shaft at the interlocked portion of said worm gear and worm comprising a control element and means mounted upon said supporting means interconnecting said worm and said control element including gearing rotatably mounted on said hollow shaft.

3. A power transmitting device for coupling a driving shaft with a driven shaft comprising a worm gear secured to said driven shaft, a worm normally interlocked with said worm gear, for transmitting rotative power to said driven shaft when motivated by said driving shaft; mechanism for motivating said worm by said driving shaft including a rotatable member; and means for counteracting the normal rotative effort of said driving shaft on said driven shaft at the interlocked portion of said worm gear and worm comprising a control element mounted coaxially with said driven shaft and means interconnecting said worm and said control element including gearing having a predetermined ratio rotatably mounted on said member whereby said driven shaft is operated at a predetermined reduced speed by said driving shaft.

4. A power transmitting device for coupling a driving shaft with a driven shaft comprising a worm gear secured to said driven shaft, a worm normally interlocked with said worm gear, for transmitting rotative power to said driven shaft when motivated by said driving shaft; mechanism for motivating said worm by said driving shaft; and means operative from said driving shaft for counteracting the normal rotative effort of said driving shaft on said driven shaft at the interlocked portion of said worm gear and said worm comprising a control element containing a second gear, a pinion intermeshed with said second gear, and means interconnecting said worm and said pinion.

5. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft; and means for counteracting the normal rotative effort of said driving shaft on said driven shaft at the interlocked portion of said worm gear and said worm by positive gearing action operative from said driving shaft comprising a control element containing a second gear mounted coaxially with said driven shaft, a pinion intermeshed with said second gear, and means interconnecting said worm and said pinion.

6. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft; and means operative from said driving shaft for counteracting the normal rotative effort of said driving shaft on said driven shaft at the interlocked portion of said worm gear and worm comprising a control element containing a gear mounted coaxially with said driven shaft, a pinion intermeshed with said gear and means interconnecting said worm and said pinion.

7. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft including a rotatable member; and means operative from said driving shaft for counteracting the normal rotative effort of said driving shaft on said driven shaft at the interlocked portion of said worm gear and worm comprising a control element containing a gear, a pinion intermeshed with said gear, and means interconnecting said worm and said pinion rotatably mounted on said member.

8. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft including a rotatable member; and means for counteracting the normal rotative effort of said driving shaft on said driven shaft at the interlocked portion of said worm gear and worm comprising a control element containing a gear, a pinion intermeshed with said gear, and means interconnecting said worm and said pinion including gearing having a predetermined ratio rotatably mounted on said member whereby said driven shaft is operated at a predetermined reduced speed by said driving shaft.

9. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft including a rotatable member; and means for counteracting the normal rotative effort of said driving shaft on said driven shaft at said worm gear and worm interlocking comprising a control element containing a skew bevel gear, a skew bevel pinion intermeshed with said skew bevel gear, and means interconnecting said worm and said bevel pinion rotatably mounted on said member.

10. A power transmitting device for coupling a driving shaft with a driven shaft comprising a worm gear secured to said driven shaft, a worm normally interlocked with said worm gear for transmitting rotative power to said driven shaft when motivated by said driving shaft; mechanism for motivating said worm by said driving shaft including a rotatable member having an extended section for rotatably carrying said worm; and means for counteracting the normal rotative effort of said driving shaft on said driven shaft at the interlocked portion of said worm gear and worm by positive gearing action operative from said driving shaft comprising a control element mounted coaxially with said driven shaft.

11. A power transmitting device for coupling a driving shaft with a driven shaft comprising a worm gear secured to said driven shaft, a worm normally interlocked with said worm gear for transmitting rotative power to said driven shaft, when motivated by said driving shaft; mechanism for motivating said worm by said driving shaft including a rotatable member having an extended section for rotatably carrying said worm, and gearing for rotating said member from said driving shaft; and means operative from said driving shaft for counteracting the normal rotative effort of said driving shaft on said driven shaft at the interlocked portion of said worm gear and worm comprising a control element containing a second gear, a pinion intermeshed with said second gear and means interconnecting said worm and said pinion rotatably mounted on said member.

WILLIAM G. H. FINCH.